United States Patent
Choi et al.

(10) Patent No.: US 9,984,982 B2
(45) Date of Patent: May 29, 2018

(54) DEVICE AND METHOD FOR GENERATING IDENTIFICATION KEY

(71) Applicant: ICTK CO., LTD., Gyeonggi-do (KR)

(72) Inventors: Byong Deok Choi, Seoul (KR); Dong Kyue Kim, Seoul (KR)

(73) Assignee: ICTK CO., LTD., Gyeonggi-do (KR)

( * ) Notice: Subject to any disclaimer, the term of this patent is extended or adjusted under 35 U.S.C. 154(b) by 0 days. days.

(21) Appl. No.: 14/916,953

(22) PCT Filed: Feb. 19, 2014

(86) PCT No.: PCT/KR2014/001319
§ 371 (c)(1),
(2) Date: Mar. 4, 2016

(87) PCT Pub. No.: WO2015/034148
PCT Pub. Date: Mar. 12, 2015

(65) Prior Publication Data
US 2016/0233177 A1    Aug. 11, 2016

(30) Foreign Application Priority Data

Sep. 6, 2013    (KR) .................. 10-2013-0107304

(51) Int. Cl.
*H01L 23/00*    (2006.01)
*G06F 21/73*    (2013.01)
(Continued)

(52) U.S. Cl.
CPC ........ *H01L 23/573* (2013.01); *G06F 17/5072* (2013.01); *G06F 17/5081* (2013.01);
(Continued)

(58) Field of Classification Search
CPC .................................................. H01L 23/573
(Continued)

(56) References Cited

U.S. PATENT DOCUMENTS 8,877,525 B1 * 11/2014 Leobandung .......... H01L 22/12
257/E21.53
2013/0101114 A1    4/2013 Kim et al.

FOREIGN PATENT DOCUMENTS

KR        101059005 B1    1/2009
KR        101139630 B1    5/2012
(Continued)

OTHER PUBLICATIONS

ISA Korean Intellectual Property Office, International Search Report Issued in Application No. PCT/KR2014/001319, dated May 27, 2014, WIPO, 5 pages.
(Continued)

*Primary Examiner* — Moazzam Hossain
*Assistant Examiner* — Warren H Kilpatrick
(74) *Attorney, Agent, or Firm* — McCoy Russell LLP

(57) ABSTRACT

The present invention relates to a device and method for generating an identification key using a process variation in a via process, and specifically the device for generating an identification key may include a first node provided in a semiconductor chip, a second node which is formed in a different layer from the first node, a via which is electrically shorted to the first node, and which is formed between the first node and the second node, the overlap distance between the second node and the via, in a pattern layout of the semiconductor chip, being adjusted to a value that is less than a threshold according to a design rule that ensures that the first node and the second node are shorted by the via, and a reader which provides an identification key by identifying whether the first node and the second node are shorted due to the via.

12 Claims, 8 Drawing Sheets

(51) Int. Cl.
      G06F 17/50        (2006.01)
      H01L 23/522       (2006.01)
      H01L 27/02        (2006.01)
      H01L 27/06        (2006.01)
      H04L 29/06        (2006.01)
      G09C 1/00         (2006.01)
      H04L 9/08         (2006.01)

(52) U.S. Cl.
      CPC .............. *G06F 21/73* (2013.01); *G09C 1/00* (2013.01); *H01L 23/5226* (2013.01); *H01L 27/0207* (2013.01); *H01L 27/0629* (2013.01); *H04L 9/0866* (2013.01); *H04L 63/06* (2013.01); *H04L 2209/12* (2013.01)

(58) Field of Classification Search
      USPC ................................ 257/48, E21.53; 438/14
      See application file for complete search history.

(56) References Cited

FOREIGN PATENT DOCUMENTS

| | | |
|---|---|---|
| KR | 1020120089607 A | 8/2012 |
| WO | 2007119190 A2 | 10/2007 |
| WO | 2012077856 A1 | 6/2012 |
| WO | 2012111872 A1 | 8/2012 |
| WO | 2012113965 A1 | 10/2012 |
| WO | 2013025060 A2 | 2/2013 |

OTHER PUBLICATIONS

European Patent Office, Extended European Search Report Issued in Application No. 14841486.5, dated Jan. 9, 2017, Germany, 8 pages.

* cited by examiner

US 9,984,982 B2

DEVICE AND METHOD FOR GENERATING IDENTIFICATION KEY

CROSS REFERENCE TO RELATED APPLICATIONS

The present application is a U.S. National Phase of International Patent Application Serial No. PCT/KR2014/001319, entitled "DEVICE AND METHOD FOR GENERATING IDENTIFICATION KEY," filed on Feb. 19, 2014, which claims priority to Korean Patent Application No. 10-2013-0107304, entitled "DEVICE AND METHOD FOR GENERATING IDENTIFICATION KEY," filed on Sep. 6, 2013, the entire contents of each of which are hereby incorporated by reference for all purposes.

TECHNICAL FIELD

The following description relates to a device and method for generating an identification key for hardware security, and more particularly, to a device and method for generating an identification key by implementing a physically unclonable function (PUF) based on a semiconductor process variation.

BACKGROUND ART

As an information-oriented society is being advanced, a necessity for protection of personal information is increasing. Also, there is a desire for a technology for building a security system configured to securely transmit the personal information by encrypting and decrypting the personal information.

Recently, various attacks, for example, a side channel attack or a reverse engineering attack, have been applied to an identification key stored in a computing device. For protection against the above attacks, a physically unclonable function (PUF) technology is being developed to securely generate and store an identification key.

A PUF may provide an identification key, that is, an unpredictable digital value. Individual PUFs may provide different digital values, even though an accurate manufacturing process is provided and the individual PUFs are manufactured through the same design and manufacturing process.

Accordingly, the PUF may be referred to as a "physical one-way function (POWF)" that is practically impossible to be duplicated.

The above characteristic of the PUF may be used to generate an identification key for security and/or authentication. For example, the PUF may be used to provide a unique key to distinguish devices from one another.

In Korean Patent Registration No. 10-1139630 (hereinafter, referred to as "'630 patent"), a method of implementing a PUF has been provided. The '630 patent discloses a method of probabilistically determining whether an interlayer contact or a via is formed between conductive layers of a semiconductor based on a semiconductor process variation.

DISCLOSURE OF INVENTION

Technical Solutions

According to an aspect of the present invention, there is provided a device for generating an identification key, the device including a first node included in a semiconductor chip, a second node formed in a different layer from the first node, a via formed between the first node and the second node and electrically shorted to the first node, an overlap distance between the second node and the via in a pattern layout of the semiconductor chip being adjusted to be less than a threshold according to a design rule that ensures that the first node and the second node are shorted by the via, and a reader configured to determine whether the first node and the second node are shorted by the via and to provide an identification key.

Whether the first node and the second node are shorted by the via may be randomly determined by a process variation in a manufacturing process of the via.

The overlap distance between the second node and the via in the pattern layout of the semiconductor chip may be adjusted to be equal to or greater than a first threshold and equal to or less than a second threshold.

The first threshold may be a minimum value of an overlap distance allowing a difference between a probability that the first node and the second node are shorted by the via and a probability that the first node and the second node are not shorted to be within a predetermined error range, and the second threshold may be a maximum value of the overlap distance allowing the difference between the probability that the first node and the second node are shorted by the via and the probability that the first node and the second node are not shorted to be within the predetermined error range.

The first threshold may be greater than an overlap distance guaranteeing that the first node and the second node are open, and the second threshold may be less than an overlap distance guaranteeing that the first node and the second node are shorted.

According to another aspect of the present invention, there is provided a device for generating an N-bit identification key, the device including N unit cells that each generate a 1-bit digital value, where N is a natural number, wherein at least one of the N unit cells includes a first node included in a semiconductor chip, a second node formed in a different layer from the first node, a via formed between the first node and the second node and electrically shorted to the first node, an overlap distance between the second node and the via in a pattern layout of the semiconductor chip being adjusted to be less than a threshold according to a design rule that ensures that the first node and the second node are shorted by the via, and a reader configured to determine whether the first node and the second node are shorted by the via and to provide an identification key.

The overlap distance between the second node and the via in the pattern layout of the semiconductor chip may be adjusted to be equal to or greater than a first threshold and equal to or less than a second threshold.

The first threshold may be a minimum value of an overlap distance allowing a difference between a probability that the first node and the second node are shorted by the via and a probability that the first node and the second node are not shorted to be within a predetermined error range, and the second threshold may be a maximum value of the overlap distance allowing the difference between the probability that the first node and the second node are shorted by the via and the probability that the first node and the second node are not shorted to be within the predetermined error range.

The first threshold may be greater than an overlap distance guaranteeing that the first node and the second node are open, and the second threshold may be less than an overlap distance guaranteeing that the first node and the second node are shorted.

According to another aspect of the present invention, there is provided a method of manufacturing a device for generating an identification key, the method including forming a first node, a second node and a via on a semiconductor substrate, and forming a reader on the semiconductor substrate, the reader being configured to determine whether the first node and the second node are electrically shorted by the via, wherein an overlap distance between the second node and the via in a pattern layout of a semiconductor chip formed on the semiconductor substrate is adjusted to be less than a threshold according to a design rule that ensures that the first node and the second node are shorted by the via.

The overlap distance between the second node and the via in the pattern layout of the semiconductor chip may be adjusted to be equal to or greater than a first threshold and equal to or less than a second threshold.

The first threshold may be a minimum value of an overlap distance allowing a difference between a probability that the first node and the second node are shorted by the via and a probability that the first node and the second node are not shorted to be within a predetermined error range, and the second threshold may be a maximum value of the overlap distance allowing the difference between the probability that the first node and the second node are shorted by the via and the probability that the first node and the second node are not shorted to be within the predetermined error range.

According to another aspect of the present invention, there is provided a method of designing a device for generating an identification key, the method including disposing a first node, a second node and a via in a pattern layout of a semiconductor chip, and disposing a reader in the pattern layout of the semiconductor chip, the reader being configured to determine whether the first node and the second node are electrically shorted by the via, wherein an overlap distance between the second node and the via in the pattern layout of the semiconductor chip is designed to be less than a threshold according to a design rule that ensures that the first node and the second node are shorted by the via.

The overlap distance between the second node and the via in the pattern layout of the semiconductor chip may be adjusted to be equal to or greater than a first threshold and equal to or less than a second threshold.

The first threshold may be a minimum value of an overlap distance allowing a difference between a probability that the first node and the second node are shorted by the via and a probability that the first node and the second node are not shorted to be within a predetermined error range, and the second threshold may be a maximum value of the overlap distance allowing the difference between the probability that the first node and the second node are shorted by the via and the probability that the first node and the second node are not shorted to be within the predetermined error range.

According to another aspect of the present invention, there is provided a method of generating an identification key, the method including generating a potential difference between a first node and a second node in a semiconductor chip, and determining, by a reader, whether the first node and the second node are electrically shorted by a via, and generating an identification key, wherein an overlap distance between the second node and the via in a pattern layout of the semiconductor chip is less than a threshold according to a design rule that ensures that the first node and the second node are shorted by the via.

The overlap distance between the second node and the via in the pattern layout of the semiconductor chip may be adjusted to be equal to or greater than a first threshold and equal to or less than a second threshold.

BEST MODE FOR CARRYING OUT THE INVENTION

Figure 1:
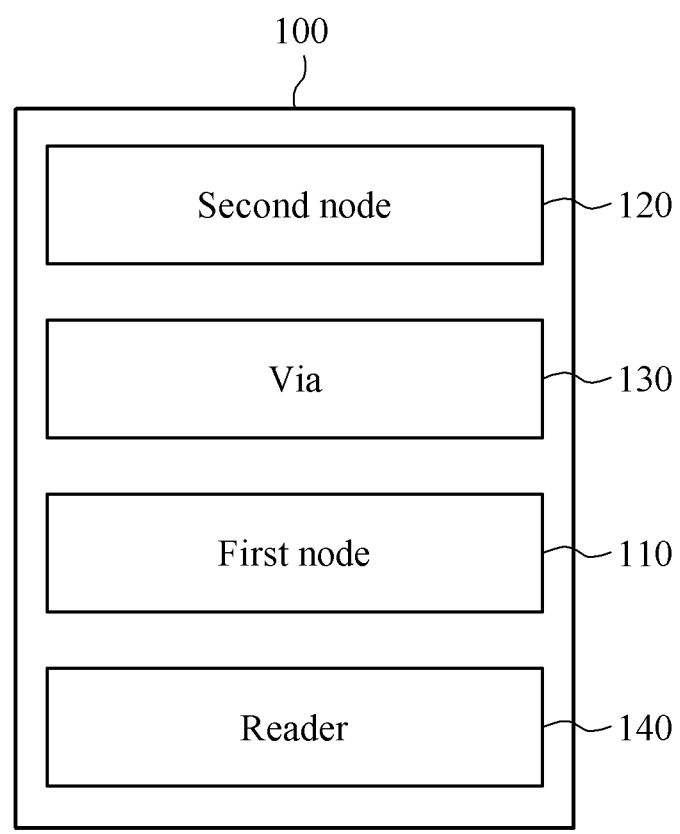
FIG. 1 is a block diagram illustrating an example of a device for generating an identification key according to an embodiment.

Hereinafter, embodiments will be described in detail with reference to the accompanying drawings.

When it is determined detailed description related to a related known function or configuration they may make the purpose of the embodiments unnecessarily ambiguous in describing the embodiments, the detailed description will be omitted here. Also, terminologies used herein are defined to appropriately describe the embodiments and thus may be changed depending on a user, the intent of an operator, or a custom of a field to which a corresponding technology pertains. Accordingly, the terminologies must be defined based on the following overall description of this specification. Like reference numerals illustrated in the drawings refer to like constituent elements.

Reference numerals used here are merely assigned for ease of description and understanding, regardless of an order of a design or manufacturing process of a semiconductor.

Hereinafter, the present invention will be described based on a via, however, an interlayer contact may be applicable instead of the via.

FIG. 1 is a block diagram illustrating a device 100 for generating an identification key according to an embodiment.

In the device 100, a value of an electrical signal, for example, a voltage, a current, and the like, may be probabilistically determined by a process variation in a manufacturing process, by adjusting a process parameter or designing a layout unlike a design rule. As a result, an identification key may be randomly output, which may ensure randomness. Also, by utilizing fixability in a semiconductor manufacturing operation, an identification key having guaranteed time-invariance may be output based on invariability of hardware after the semiconductor is manufactured.

The design rule may specify a minimum value of an overlap distance between a via and a second node to guarantee a short circuit between a first node and the second node. Hereinafter, unless otherwise stated, the design rule will be understood as described above.

To this end, the device 100 may include a first node 110, a second node 120, a via 130, and a reader 140.

The first node 110 may be included in a semiconductor chip, and the first node 110 and the second node 120 may be formed in different layers. Whether the first node 110 and the second node 120 are shorted may be determined by the via 130 formed between the first node 110 and the second node 120.

A via hole formed according to a design rule based on a semiconductor layout may be formed as the via 130 to short the first node 110 and the second node 120.

The via 130 may have a depth (or a height) through a via hole etching process, and a surface area of the via 130 may change based on the depth. Generally, the surface area of the via 130 may gradually decrease towards the second node 120 located below the via 130. Accordingly, when relative positions of the second node 120 and the via 130 do not comply with the design rule based on the semiconductor layout, the first node 110 and the second node 120 may not be shorted by the via 130.

The device 100 may allow the via 130 to be located unlike a design rule (hereinafter, referred to as a design rule) ensuring a short circuit between a first node and a second node, so that a difference between a probability that the first node 110 and the second node 120 are shorted and a probability that the first node 110 and the second node 120 are not shorted may be within a predetermined error range. For example, when the probability that the first node 110 and the second node 120 are shorted and the probability that the first node 110 and the second node 120 are not shorted correspond to 55% and 45%, respectively, the difference between the probabilities may correspond to "10"%. In this example, when the predetermined error range corresponds to "5"%, the difference between the probability that the first node 110 and the second node 120 are shorted and the probability that the first node 110 and the second node 120 are not shorted may be determined not to be within the predetermined error range. When the predetermined error range corresponds to "15"%, "10"% corresponding to the difference between the probability that the first node 110 and the second node 120 are shorted and the probability that the first node 110 and the second node 120 are not shorted may be determined to be within "15"% corresponding to the predetermined error range. Accordingly, by violating the design rule, the device 100 may prevent a significant increase in one of the probability that the first node 110 and the second node 120 are shorted and the probability that the first node 110 and the second node 120 are not shorted, and may provide randomness depending on whether a short circuit occurs. For example, to prevent a significant increase in one of the probability that the first node 110 and the second node 120 are shorted and the probability that the first node 110 and the second node 120 are not shorted, the device 100 may adjust an overlap distance between the second node 120 and the via 130.

In a pattern layout of a semiconductor chip, the overlap distance between the second node 120 and the via 130 may be adjusted to be less than a threshold according to the design rule that ensures that the first node 110 and the second node 120 are shorted by the via 130.

The overlap distance may be adjusted in a semiconductor design operation. However, this is merely an example, and it is possible to create the same result through an intended operation in a manufacturing process. Accordingly, even though description of a portion of a design or a manufacturing process is provided below, it should be understood that there is no limitation to some embodiments by the description.

The overlap distance may be a width of an overlapping area between the second node 120 and the via 130 in a pattern layout of a semiconductor based on relative positions of the second node 120 and the via 130, and may not indicate that the second node 120 and the via 130 physically overlap and are shorted. For example, the overlap distance may be interpreted as a width of an overlapping area between the second node 120 and a projection image of the via 130 generated by projecting the via 130 in a direction in which the via 130 is formed from the first node 110 to the second node 120.

The overlap distance will be further described with reference to FIG. 2.

Figure 2:
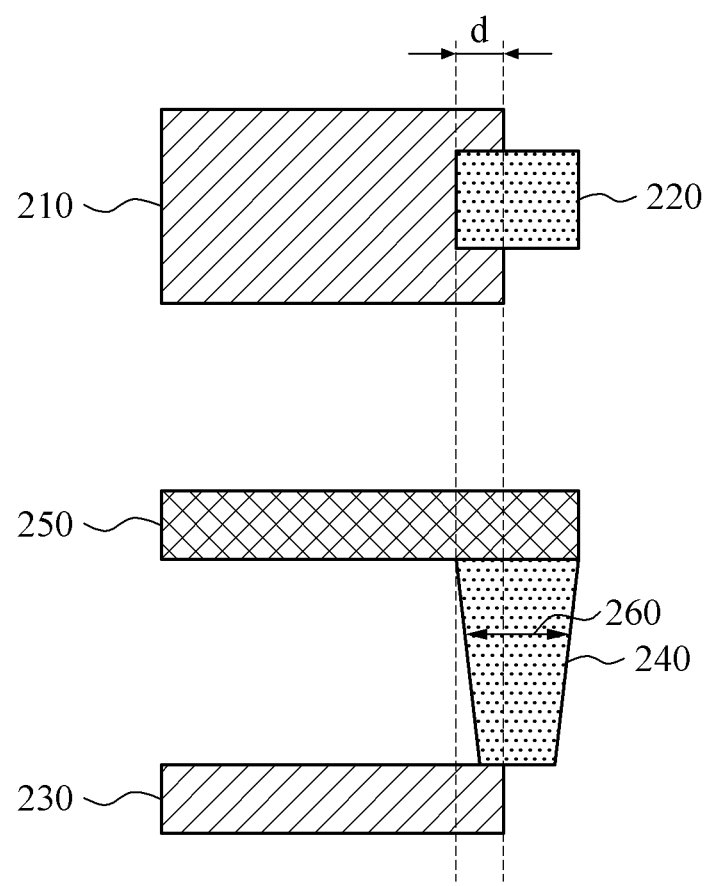
FIG. 2 is a top view and a cross-sectional view illustrating a device for generating an identification key according to an embodiment.

FIG. 2 is a top view and a cross-sectional view illustrating a device for generating an identification key according to an embodiment.

The top view of the device for generating an identification key shows a second node 210 and a via 220. For convenience of description, a first node is not shown in FIG. 2, and an overlap distance d is described based on the top view.

As shown in the top view of the device for generating an identification key, the second node 210 and the via 220 may overlap in an area corresponding to the overlap distance "d." The cross-sectional view shows a first node 250, a second node 230, and a via 240 formed from the first node 250 to the second node 230. As shown in the cross-sectional view, a cross-sectional width 260 of the via 240 may decrease towards the second node 230, and a probability that the first node 250 to the second node 230 are shorted by the via 240 may be determined based on a range of the overlap distance "d" to be established according to the design rule.

Referring back to FIG. 1, the reader 140 may determine whether the first node 110 and the second node 120 are shorted by the via 130 and may provide an identification key.

Because whether the first node 110 and the second node 120 are shorted is randomly determined by a process parameter or a process variation, despite the same overlap distance, randomness of a digital value generated by a physically unclonable function (PUF) may be guaranteed.

Using the device 100, it is impossible to perform duplication to output the same identification key even though a hardware structure is exactly known, due to randomness based on the process parameter or the process variation. Also, it is possible to provide reliability based on a result by providing an output invariant over time.

Figure 3:
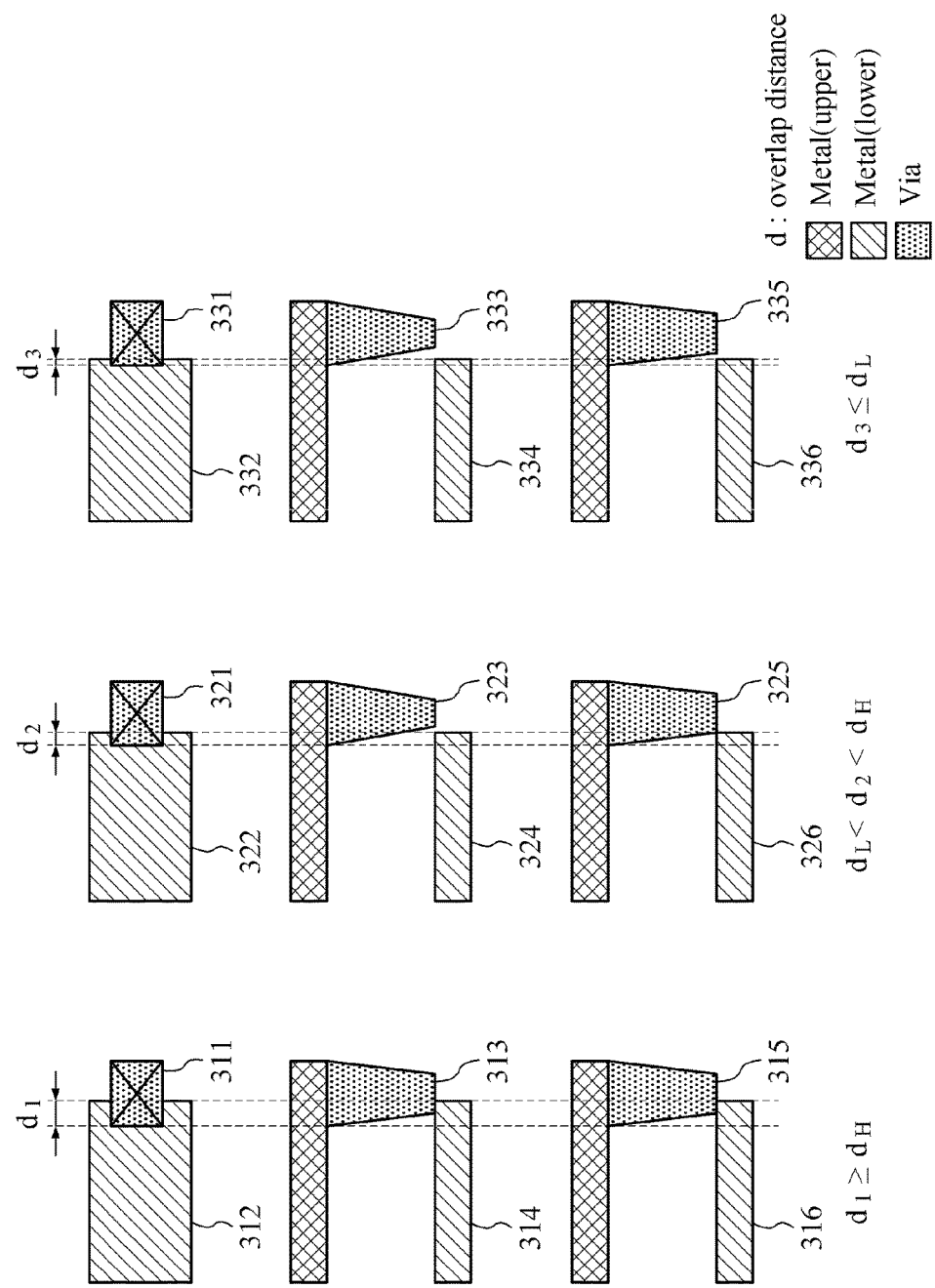
FIG. 3 illustrates top views and cross-sectional views of a device for generating an identification key based on an overlap distance according to an embodiment.

FIG. 3 illustrates top views and cross-sectional views of a device for generating an identification key based on an overlap distance according to an embodiment.

The top views may have reference numerals 311, 312, 321, 322, 331 and 332. The cross-section view corresponding to reference numerals 311 and 312 may have reference numerals 313, 314, 315 and 316, and the cross-sectional view corresponding to reference numerals 321 and 322 may have reference numerals 323, 324, 325 and 326. Also, the cross-sectional view corresponding to reference numerals 331 and 332 may have reference numerals 333, 334, 335 and 336.

In an example of $d_1 \geq d_H$, a second node 312 and a via 311 may overlap by an overlap distance $d_1$ in a layout, and $d_1$ may be equal to or greater than $d_H$. For example, $d_H$ may be interpreted as a minimum value of an overlap distance guaranteeing that the second node 312 and the via 311 are shorted. Vias 313 and 315 formed towards second nodes 314 and 316 may be mostly shorted to the second nodes 314 and 316.

In an example of $d_L<d_2<d_H$, a second node 322 and a via 321 may overlap by an overlap distance $d_2$ in a layout. In this example, $d_2$ may be included in a range between $d_L$ and $d_H$. For example, $d_L$ may be a maximum value of an overlap distance guaranteeing that the second node 322 and the via 321 are open, and $d_H$ may be a minimum value of an overlap distance guaranteeing that the second node 322 and the via 321 are shorted.

A device for generating an identification key may determine a probability that a first node and a second node are shorted by a via based on an overlap distance set to $d_2$. For example, to determine the probability that the first node and the second node are shorted by the via to be about 50%, $d_2$ may be determined using Equation 1.

$$d_2 = \frac{d_L + d_H}{2} \quad \text{[Equation 1]}$$

The above probability will be further described with reference to FIG. 4.

In an example of $d_3 \leq d_L$, a second node 332 and a via 331 may overlap by an overlap distance $d_3$ in a layout, and $d_3$ may be equal to or less than $d_L$. For example, $d_L$ may be a maximum value of an overlap distance guaranteeing that the second node 332 and the via 331 are open. In the example of $d_3 \leq d_L$, the via 331 and the second node 332 may hardly be shorted.

In the device for generating an identification key, due to the overlap distance $d_2$ between $d_L$ and $d_H$, a probability that the second node and the via 331 are shorted may have randomness. For example, when the overlap distance $d_2$ is close to a threshold as one of $d_L$ and $d_H$ between $d_L$ and $d_H$, the probability that the second node and the via 331 are shorted may change slightly. However, in this example, the second node and the via may be "shorted" and/or "open," and thus randomness may be guaranteed.

Figure 4:
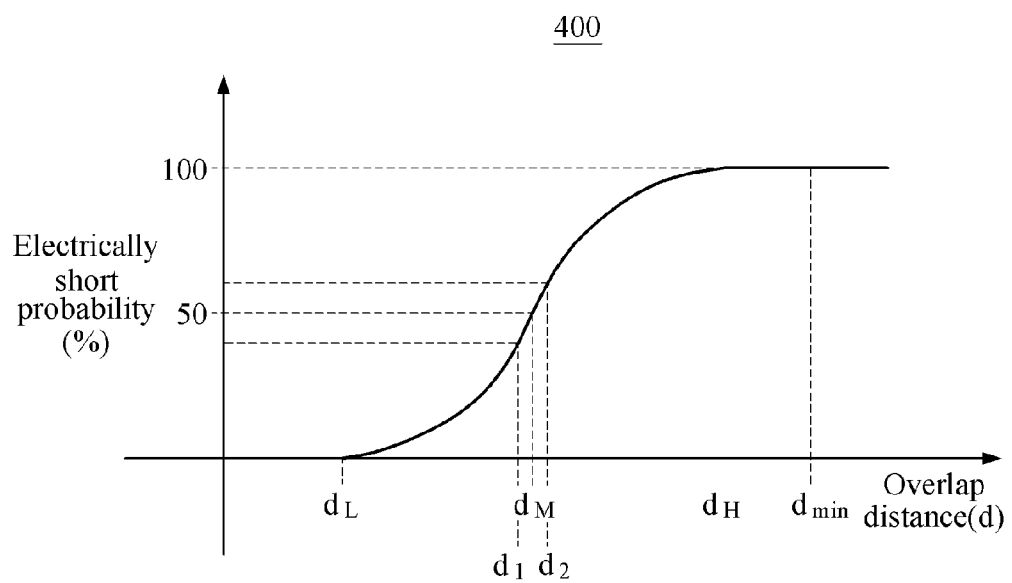
FIG. 4 is a graph illustrating a probability that nodes are electrically shorted based on an overlap distance.

FIG. 4 is a graph illustrating a probability that nodes are electrically shorted based on an overlap distance.

When an overlap distance between a second node and a via is reduced to a value equal to or less than "$d_H$," a probability that the second node and the via are connected and shorted to each other may gradually decrease. When the overlap distance is equal to or less than "$d_L$," a short circuit may not occur any more. Thus, in a device for generating an identification key, based on an overlap distance $d_M$ between $d_L$ and $d_H$, a probability that a first node and the second node are shorted may be determined.

In the present disclosure, for convenience of description, expressions "short circuit between a second node and a via" and "short circuit between a first node and a second node" may be used interchangeably. Because the first node and the via are electrically shorted, a "short circuit between a second node and a via" may be interpreted to be the same as a "short circuit between a first node and a second node."

In a graph 400 of FIG. 4, $d_M$ denotes a value between $d_L$ and $d_H$, and may be located in a center between $d_L$ and $d_H$. Also, drain denotes a minimum value of an overlap distance satisfying a design rule.

In addition, $d_L$ denotes a maximum value of an overlap distance guaranteeing that the second node and the via are open. In the above condition, the second node and the via may be open.

Furthermore, $d_1$ may be interpreted as a minimum value of an overlap distance to allow a difference between a probability that the first node and the second node are shorted by the via and a probability that the first node and the second node are not shorted to be within a predetermined error range. Also, $d_2$ may be a maximum value of the overlap distance to allow the distance between the probability that the first node and the second node are shorted by the via and the probability that the first node and the second node are not shorted to be within the predetermined error range. For example, $d_1$ may be greater than a maximum overlap distance $d_L$ guaranteeing that the first node and the second node are open, and $d_2$ may be less than a minimum overlap distance $d_H$ guaranteeing that the first node and the second node are shorted.

As shown in the graph 400, when an overlap distance between the second node and the via is designed to be $d_M$, a probability that the second node and the via are shorted may be about 50%. The overlap distance may be designed to be $d_M$ in a process variation in a manufacturing process of the via, and thus the device for generating an identification key may generate an identification key having randomness of whether the second node and the via are shorted or open.

Figure 5:
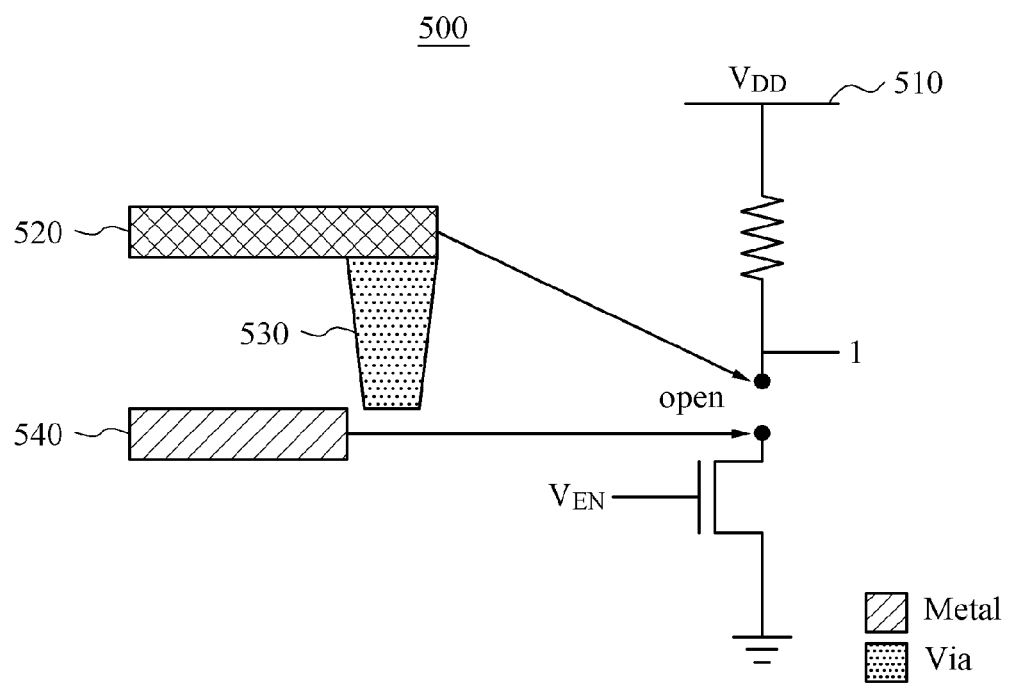
FIG. 5 is a diagram illustrating a process of generating an identification key when a second node and a via are open in a device for generating an identification key according to an embodiment.
Figure 6:
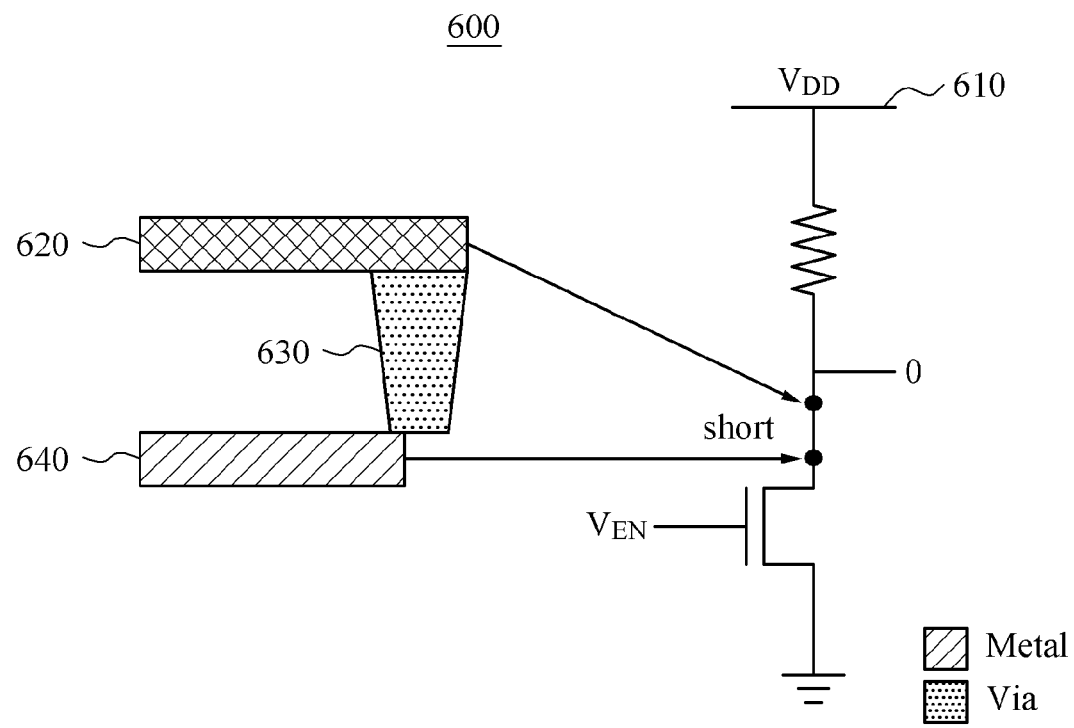
FIG. 6 is a diagram illustrating a process of generating an identification key when a second node and a via are shorted in a device for generating an identification key according to an embodiment.

FIG. 5 is a diagram illustrating a process of generating an identification key when a second node 540 and a via 530 are open in a device 500 for generating an identification key according to an embodiment. FIG. 6 is a diagram illustrating a process of generating an identification key when a second node 640 and a via 630 are shorted in a device 600 for generating an identification key according to an embodiment.

In FIGS. 5 and 6, a metal-oxide-semiconductor field-effect transistor (MOSFET) is described as an example of a transistor, however, a transistor, for example, a bipolar junction transistor (BJT) or a diode may be used.

A reader 510 may determine, based on the formed via 530, whether a first node 520 and the second node 540 are shorted by the via 530, and may provide an identification key. To generate the identification key, the reader 510 may generate a PUF. A circuit for generation of a PUF is shown in FIG. 5.

In an example, the reader 510 may have a structure of a pull-down circuit including a resistor and an N-channel metal oxide semiconductor (NMOS) transistor. Based on whether nodes are open or shorted, a connection between an output node and a drain node of the NMOS transistor may be open or shorted.

In another example, the reader 510 may have a structure of a pull-up circuit including a resistor and a P-channel metal oxide semiconductor (PMOS) transistor. For example, when an enable signal $V_{EN}$ transmitted to a gate of the NMOS transistor has a high value, and when the first node 520 and the second node 540 are open, the value of $V_{OUT}$ may be "1."

A reader 610 may determine, based on the formed via 630, whether a first node 620 and the second node 640 are shorted by the via 630, and may provide an identification key. For example, when an enable signal $V_{EN}$ transmitted to a gate of an NMOS transistor has a high value, and when the first node 620 and the second node 640 are shorted, the value of $V_{OUT}$ may be "0."

For example, a device for generating an identification key may output at least one identification key based on $V_{OUT}$ of "0" or "1," as shown in FIGS. 5 and 6.

Figure 7:
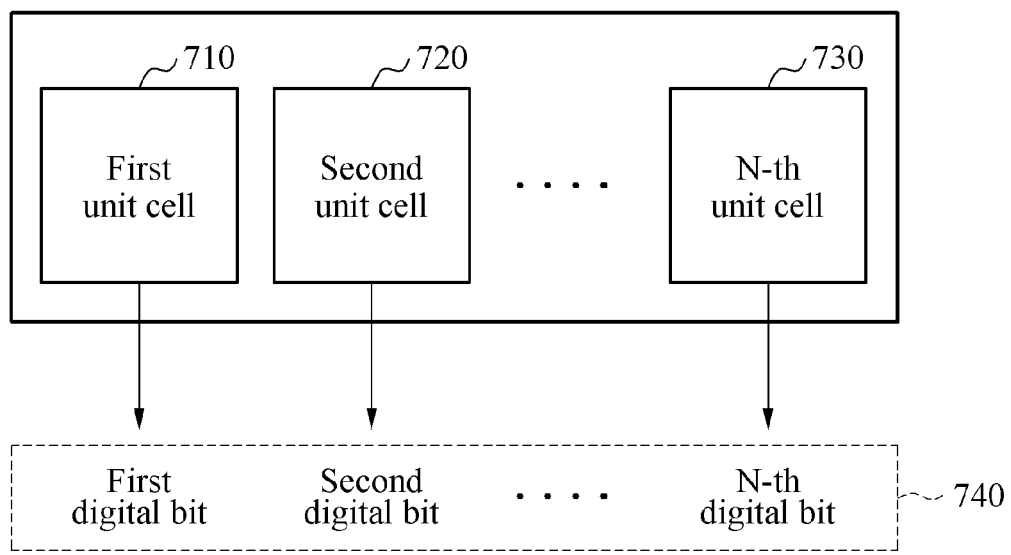
FIG. 7 is a block diagram illustrating another example of a device for generating an identification key according to an embodiment.

FIG. 7 is a block diagram illustrating a device 700 for generating an identification key according to an embodiment.

In the device 700, a value of an electrical signal, for example, a voltage, a current, and the like, may be probabilistically determined by a process variation in a manufacturing process, by adjusting a process parameter or designing a layout unlike a design rule. As a result, an N-bit identification key 740 may be randomly output, and thus it is possible to secure randomness.

Also, by utilizing fixability in a semiconductor manufacturing operation, the N-bit identification key 740 having guaranteed time-invariance may be output based on invariability of hardware after the semiconductor is manufactured.

The device 700 may include a plurality of unit cells, for example, unit cells 710, 720 and 730, and may generate the N-bit identification key 740 based on a plurality of digital bits output respectively from the unit cells 710, 720 and 730.

Each of the unit cells 710, 720 and 730 may generate a 1-bit digital value. At least one unit cell among the unit cells 710, 720 and 730 may include a first node, a second node, a via and a reader.

The first node may be included in a semiconductor chip, and the first node and the second node may be formed in different layers. Whether the first node and the second node are shorted may be determined by a via formed from the first node to the second node.

A via hole formed according to a design rule based on a semiconductor layout may be formed as the via to short the first node and the second node.

The device 700 may allow a difference between a probability that the first node and the second node are shorted and a probability that the first node and the second node are not shorted to be within a predetermined error range, using a via designed unlike a design rule. Accordingly, unlike the design rule, the device 700 may provide randomness depending on whether the first node and the second node are shorted, by preventing a significant increase in one of the probability that the first node and the second node are shorted and the probability that the first node and the second node are not shorted. For example, to prevent a significant increase in one of the probability that the first node and the second node are shorted and the probability that the first node and the second node are not shorted, the device 700 may adjust an overlap distance between the second node and the via.

The overlap distance may be an overlapping area between the second node and the via overlap in a pattern layout of a semiconductor based on relative positions of the second node and the via, and may not indicate that the second node and the via physically overlap and are shorted.

In a pattern layout of a semiconductor chip, the overlap distance between the second node and the via may be adjusted to be equal to or greater than a first threshold and equal to or less than a second threshold.

Here, the first threshold may be a minimum value of an overlap distance allowing a difference between a probability that the first node and the second node are shorted by the via and a probability that the first node and the second node are not shorted to be within a predetermined error range, and the second threshold may be a maximum value of the overlap distance allowing the difference between the probability that the first node and the second node are shorted by the via and the probability that the first node and the second node are not shorted to be within the predetermined error range.

Also, the first threshold may be greater than an overlap distance guaranteeing that the first node and the second node are open, and the second threshold may be less than an overlap distance guaranteeing that the first node and the second node are shorted.

Figure 8:
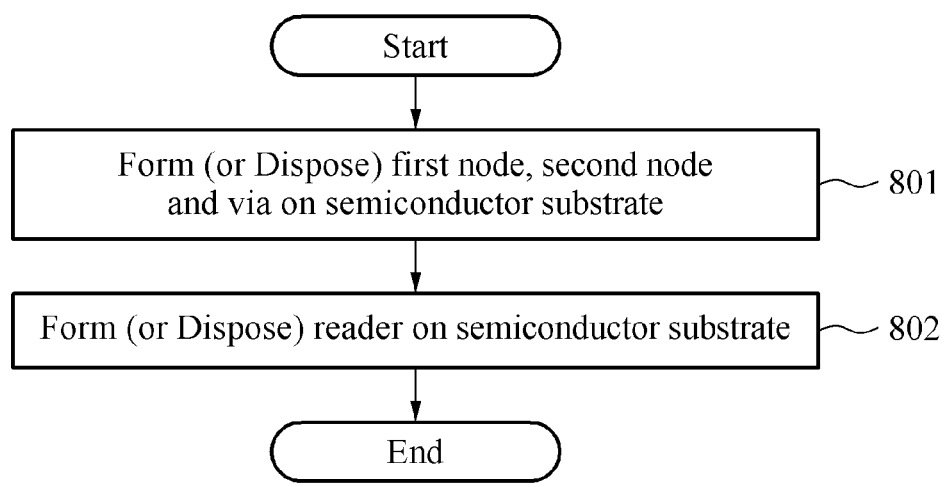
FIG. 8 is a flowchart illustrating a method of designing and manufacturing a device for generating an identification key according to an embodiment.

FIG. 8 is a flowchart illustrating a method of designing and manufacturing a device for generating an identification key according to an embodiment.

In operation 801, the method of FIG. 8 may form or dispose a first node, a second node and a via on a semiconductor substrate.

In operation 802, the method of FIG. 8 may form or dispose, on the semiconductor substrate, a reader configured to determine whether the first node and the second node are electrically shorted by the via.

An overlap distance between the second node and the via in a pattern layout of a semiconductor chip formed on the semiconductor substrate may be adjusted to be less than a threshold according to a design rule that ensures that the first node and the second node are shorted by the via.

For example, the overlap distance between the second node and the via in the pattern layout of the semiconductor chip may be adjusted to be equal to or greater than a first threshold and equal to or less than a second threshold.

For example, the first threshold may be a minimum value of an overlap distance allowing a difference between a probability that the first node and the second node are shorted by the via and a probability that the first node and the second node are not shorted to be within a predetermined error range, and the second threshold may be a maximum value of the overlap distance allowing the difference between the probability that the first node and the second node are shorted by the via and the probability that the first node and the second node are not shorted to be within the predetermined error range.

Figure 9:
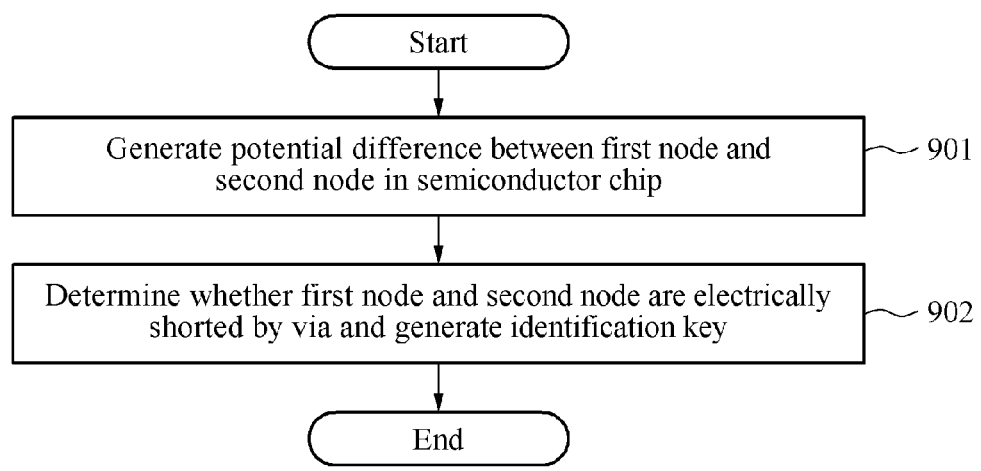
FIG. 9 is a flowchart illustrating a method of generating an identification key according to an embodiment.

FIG. 9 is a flowchart illustrating a method of generating an identification key according to an embodiment.

In operation 901, the method of FIG. 9 may generate a potential difference between a first node and a second node in a semiconductor chip.

In operation 902, the method of FIG. 9 may determine, using a reader, whether the first node and the second node are electrically shorted by a via and may generate an identification key.

An overlap distance between the second node and the via in a pattern layout of the semiconductor chip may be less than a threshold according to a design rule that ensures that the first node and the second node are shorted by the via.

Also, the overlap distance between the second node and the via in the pattern layout of the semiconductor chip may be adjusted to be equal to or greater than a first threshold and equal to or less than a second threshold.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A device for generating an identification key, the device comprising:
   a first node included in a semiconductor chip;
   a second node formed in a different layer from the first node;
   a via formed between the first node and the second node and electrically shorted to the first node, an overlap distance between the second node and the via in a pattern layout of the semiconductor chip being adjusted to be less than a threshold according to a design rule that ensures that the first node and the second node are shorted by the via, the overlap distance being a width of an overlapping area between the second node and a projection image of the via generated by projecting the via in a direction in which the via is formed from the first node to the second node, and wherein the via has a bottom surface area which extends over an edge of the second node so as to only partially overlap the second node; and
   a reader configured to determine whether the first node and the second node are shorted by the via and to provide an identification key.

2. The device of claim 1, wherein whether the first node and the second node are shorted by the via is randomly determined by a process variation in a manufacturing process of the via.

3. The device of claim 1, wherein the overlap distance between the second node and the via in the pattern layout of the semiconductor chip is adjusted to be equal to or greater than a first threshold and equal to or less than a second threshold.

4. The device of claim 3, wherein the first threshold is a minimum value of an overlap distance allowing a difference between a probability that the first node and the second node are shorted by the via and a probability that the first node and the second node are not shorted to be within a predetermined error range, and
   wherein the second threshold is a maximum value of the overlap distance allowing the difference between the probability that the first node and the second node are shorted by the via and the probability that the first node and the second node are not shorted to be within the predetermined error range.

5. The device of claim 3, wherein the first threshold is greater than an overlap distance guaranteeing that the first node and the second node are open, and
   wherein the second threshold is less than an overlap distance guaranteeing that the first node and the second node are shorted.

6. A device for generating an N-bit identification key, the device comprising N unit cells that each generate a 1-bit digital value, where N is a natural number,
   wherein at least one of the N unit cells comprises:
      a first node included in a semiconductor chip;
      a second node formed in a different layer from the first node;
      a via formed between the first node and the second node and electrically shorted to the first node, an overlap distance between the second node and the via in a pattern layout of the semiconductor chip being adjusted to be less than a threshold according to a design rule that ensures that the first node and the second node are shorted by the via, the overlap distance being a width of an overlapping area between the second node and a projection image of the via generated by projecting the via in a direction in which the via is formed from the first node to the second node, wherein the via has a bottom surface area which extends over an edge of the second node so as to only partially overlap the second node; and
      a reader configured to determine whether the first node and the second node are shorted by the via and to provide an identification key.

7. The device of claim 6, wherein the overlap distance between the second node and the via in the pattern layout of the semiconductor chip is adjusted to be equal to or greater than a first threshold and equal to or less than a second threshold.

8. The device of claim 7, wherein the first threshold is a minimum value of an overlap distance allowing a difference between a probability that the first node and the second node are shorted by the via and a probability that the first node and the second node are not shorted to be within a predetermined error range, and
   wherein the second threshold is a maximum value of the overlap distance allowing the difference between the probability that the first node and the second node are shorted by the via and the probability that the first node and the second node are not shorted to be within the predetermined error range.

9. The device of claim 7, wherein the first threshold is greater than an overlap distance guaranteeing that the first node and the second node are open, and
   wherein the second threshold is less than an overlap distance guaranteeing that the first node and the second node are shorted.

10. A method of designing a device for generating an identification key, the method comprising:
    disposing a first node, a second node and a via in a pattern layout of a semiconductor chip; and
    disposing a reader in the pattern layout of the semiconductor chip, the reader being configured to determine whether the first node and the second node are electrically shorted by the via,
    wherein an overlap distance between the second node and the via in the pattern layout of the semiconductor chip is designed to be less than a first threshold according to a design rule that ensures that the first node and the second node are shorted by the via and wherein the overlap distance is designed to be greater than a second threshold that ensures that the first node and the second node are open.

11. The method of claim 10, wherein the overlap distance between the second node and the via in the pattern layout of the semiconductor chip is adjusted to be equal to or greater than a third threshold and equal to or less than a fourth threshold.

12. The method of claim 11, wherein the third threshold is a minimum value of an overlap distance allowing a difference between a probability that the first node and the second node are shorted by the via and a probability that the first node and the second node are not shorted to be within a predetermined error range, and
    wherein the fourth threshold is a maximum value of the overlap distance allowing the difference between the probability that the first node and the second node are shorted by the via and the probability that the first node and the second node are not shorted to be within the predetermined error range.

* * * * *